US012340776B2

(12) United States Patent
Myles et al.

(10) Patent No.: US 12,340,776 B2
(45) Date of Patent: *Jun. 24, 2025

(54) RUGGEDIZED REMOTE CONTROL DISPLAY LATENCY AND LOSS OF SIGNAL DETECTION FOR HARSH AND SAFETY-CRITICAL ENVIRONMENTS

(71) Applicant: Mason Electric Co., Sylmar, CA (US)

(72) Inventors: Robert Jay Myles, Reseda, CA (US); Thomas C. Ruberto, Thousand Oaks, CA (US); Christopher L. Sommerville, Encino, CA (US); Harout Markarian, Porter Ranch, CA (US); Kelly P. Ambriz, Newbury Park, CA (US)

(73) Assignee: Mason Electric Co., Sylmar (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,580

(22) Filed: Feb. 14, 2023

(65) Prior Publication Data
US 2023/0197034 A1    Jun. 22, 2023

Related U.S. Application Data

(63) Continuation of application No. 17/120,972, filed on Dec. 14, 2020, now Pat. No. 11,580,930.

(Continued)

(51) Int. Cl.
*G09G 5/00* (2006.01)
*A63F 13/235* (2014.01)
(Continued)

(52) U.S. Cl.
CPC ........... *G09G 5/006* (2013.01); *A63F 13/235* (2014.09); *G08B 5/22* (2013.01); *G08B 21/182* (2013.01);

(Continued)

(58) Field of Classification Search
CPC .... G09G 5/006; G09G 2354/00; G09G 5/363; G09G 2320/0252; G09G 2340/125;
(Continued)

(56) References Cited

U.S. PATENT DOCUMENTS 6,494,830 B1    12/2002  Wessel
6,998,548 B2    2/2006   Huang
(Continued)

OTHER PUBLICATIONS https://www.ultra-electronics.com/ems/capabilities/hmi-solutions/products-soldier-portable-controls.
https://www.fortrobotics.com/wireless-industrial-remote-control/.
https://www.otto-controls.com/g3-dual-grip-remote-with-usb-output.

*Primary Examiner* — Michael Lee
(74) *Attorney, Agent, or Firm* — K&L Gates LLP

(57) ABSTRACT

Systems, methods, and apparatuses are disclosed for overcoming latency and loss of signal detection in remote control displays. An exemplary system includes a remote control, a host computing device, and one or more target systems communicatively coupled to each other over a wired and/or wireless network. One method includes receiving, by the remote control and from a host computing device, a first video frame captured by a target device, determining a first time corresponding to receipt of the first video frame, receiving, from the host computing device, a second video frame, determining a second time corresponding to receipt of the second video frame, comparing the time difference to a latency threshold, and causing an alert graphic element to be displayed indicating a latency in communication.

12 Claims, 11 Drawing Sheets

Related U.S. Application Data

(60) Provisional application No. 62/947,067, filed on Dec. 12, 2019.

(51) Int. Cl.
*G08B 5/22* (2006.01)
*G08B 21/18* (2006.01)
*H04L 67/125* (2022.01)
*H04N 21/422* (2011.01)
*H04N 21/4363* (2011.01)

(52) U.S. Cl.
CPC ....... *H04L 67/125* (2013.01); *H04N 21/4222* (2013.01); *H04N 21/43637* (2013.01); *G09G 2354/00* (2013.01)

(58) Field of Classification Search
CPC .......... G09G 2350/00; G09G 2370/022; A63F 13/235; G08B 5/22; G08B 21/182; H04L 67/125; H04L 65/612; H04L 65/762; H04L 65/80; H04N 21/4222; H04N 21/43637; H04N 7/185
See application file for complete search history.

(56) References Cited

U.S. PATENT DOCUMENTS

| | | | |
|---|---|---|---|
| 7,094,216 B2 | 8/2006 | Trombley, III et al. | |
| D533,142 S | 12/2006 | Chen et al. | |
| 7,271,354 B2 | 9/2007 | Huang | |
| 7,471,216 B2 | 12/2008 | Chen et al. | |
| D589,515 S | 3/2009 | Brunner et al. | |
| D606,946 S | 12/2009 | Zheng | |
| D611,477 S | 3/2010 | Brunner et al. | |
| 7,927,216 B2 | 4/2011 | Ikeda et al. | |
| 8,313,379 B2 | 11/2012 | Ikeda et al. | |
| 8,342,964 B2 | 1/2013 | Lai | |
| 8,430,753 B2 | 4/2013 | Ikeda et al. | |
| D698,358 S | 1/2014 | Beams | |
| D710,815 S | 9/2014 | Kim et al. | |
| 8,821,284 B2 | 9/2014 | Jennings et al. | |
| 8,864,566 B2 | 10/2014 | Snoddy et al. | |
| 8,951,124 B2 | 2/2015 | Hussman et al. | |
| RE45,905 E | 3/2016 | Ikeda et al. | |
| D751,201 S | 3/2016 | LaRose et al. | |
| 9,492,747 B2 | 11/2016 | Yamada et al. | |
| 9,584,846 B2 | 2/2017 | Bleacher et al. | |
| D783,095 S | 4/2017 | Raina et al. | |
| 9,643,083 B2 | 5/2017 | Hussman et al. | |
| 9,662,570 B2 | 5/2017 | Hussman et al. | |
| 9,675,879 B2 | 6/2017 | Hussman et al. | |
| 9,675,880 B2 | 6/2017 | Hussman et al. | |
| 9,682,317 B2 | 6/2017 | Hussman et al. | |
| 9,751,009 B2 | 9/2017 | Hussman et al. | |
| 9,804,693 B2 | 10/2017 | Long | |
| 9,973,609 B2 | 5/2018 | Doolin | |
| 9,990,045 B2 | 6/2018 | Long | |
| 10,078,377 B2 | 9/2018 | Balan et al. | |
| 10,130,875 B2 | 11/2018 | Long | |
| 11,580,930 B2 * | 2/2023 | Myles | H04L 65/612 |
| 2014/0194062 A1 * | 7/2014 | Palin | H04W 24/00 455/67.11 |
| 2014/0226924 A1 | 8/2014 | Judge | |
| 2015/0230207 A1 | 8/2015 | Wang | |
| 2016/0198068 A1 * | 7/2016 | Makar | H04N 5/0675 348/518 |
| 2016/0212704 A1 * | 7/2016 | Matsunaga | H04W 52/0229 |
| 2018/0115795 A1 | 4/2018 | Chinnaiyan | |
| 2020/0036944 A1 | 1/2020 | Zhu | |
| 2020/0280761 A1 | 9/2020 | Staples | |

\* cited by examiner

RUGGEDIZED REMOTE CONTROL DISPLAY LATENCY AND LOSS OF SIGNAL DETECTION FOR HARSH AND SAFETY-CRITICAL ENVIRONMENTS

PRIORITY CLAIM

This application is a continuation of U.S. application Ser. No. 17/120,972, filed Dec. 14, 2020, now U.S. Pat. No. 11,580,930, which claims priority to U.S. Provisional Application No. 62/947,067, filed Dec. 12, 2019, the disclosures of which are hereby incorporated by reference in their entirety.

TECHNICAL FIELD

This application relates generally to remote control displays, and more particularly to overcoming latency and loss of signal detection in remote control displays.

BACKGROUND

Unmanned systems are typically controlled via one or more remote controls. Unmanned systems can include surveillance platforms, device arms, cranes, weapons, pipeline crawlers, aerial vehicles, water-based vehicles, land-based vehicles, and subterranean-based vehicles. An operator uses the one or more remote controls for providing commands to the unmanned system. In some instances, the remote controls are directly wired to an unmanned system. In other instances, the remote controls are wirelessly linked to an unmanned system. However, in most instances, especially for more sophisticated or larger systems (such as process controls or unmanned vehicles with long ranges) remote controls provide inputs to a host computer/server and a communication network, which in turn communicates with the unmanned system.

To control unmanned systems, operators manipulate controls (e.g., buttons, joysticks, touch sensors, etc.) on a panel of a remote control unit ("RCU"). The RCU communicates control information that is indicative of the operator manipulations of the controls to a host computer either directly (wired connection) or wirelessly. The host system interprets the control information, then relays appropriate commands to the unmanned system using a direct wired link, a wireless link, a satellite communications link, a radio-frequency ("RF") communications link, a cellular communications link, or combinations thereof. The unmanned system simultaneously transmits feedback information to the host computer. The feedback data may include location information, heading, altitude, ground speed, estimated range/battery life, weapon system status, and/or diagnostic information. The feedback data may take the form of video data, audio data, inferred data, or other sensed data that is indicative of an environment in view or in proximity to the remotely located unmanned system.

More recent RCUs have a graphical user interface, such as a display screen or touchscreen. For these RCUs, a host computer streams video data recorded by the unmanned system for display at the RCU. The video data oftentimes provides a real-time or near real-time view from the unmanned system. An operator may use the video display for navigation and control to complete a desired mission, possibly in an augmented reality application. The video displays are especially useful when an unmanned system is no longer within sight of an operator. The close proximity of the screen to the controls on the RCU enables an operator to view the video data while providing control manipulations without having to shift their attention to a separate display monitor, keypad or joystick at a host computer or server.

Oftentimes, a video connection between a target system and an RCU may become interrupted or video frame transmission may become delayed. A video delay of even a few seconds may not be readily apparent to an operator. Oftentimes, an operator makes a control decision based on the current video display. However, a delay as little as a half second between the video viewed by the operator and the actual position of the target system could cause the target system to miss a target, overshoot a waypoint, or crash. As such, video latency is a significant issue for target systems controlled by RCUs.

SUMMARY

The following summary is for illustrative purposes only, and is not intended to limit or constrain the detailed description.

The disclosure is directed to systems, methods, apparatuses, and computer readable media for overcoming latency and loss of signal detection in remote control displays. An exemplary system may include a remote control device, a host computing device, and one or more target systems communicatively coupled to each other over a wired and/or wireless network. An exemplary apparatus of the remote control device may include a display screen, a memory device, a communication interface, and one or more processors. The display screen may display video data and graphic elements. The video data may be generated by the one or more target systems and may be relayed to the remote control device (e.g., via the host computing device). The memory device may store one or more files for various graphic elements (e.g., alert graphic elements, video data graphic elements, etc.), one or more display parameters for displaying the various graphic elements and one or more thresholds (e.g., a latency threshold, a loss of signal threshold, etc.). The memory device may also store instructions for the processor to perform one or more exemplary methods discussed in the present disclosure. The communication interface may comprise an application programming interface ("API") communicatively coupled to the memory device. The communication interface may enable the host computing device to specify the display parameters of the alert graphic element and the video data graphic element, and/or cause the video data and alert graphic elements to be displayed.

An exemplary method may include the remote control device receiving, from a host computing device, a first video frame comprising first video data captured by a target device. The remote control device may determine, via its processors, a first time corresponding to receipt of the first video frame by the remote control device. The first video frame may be displayed, in accordance with one or more video display parameters, on the display screen.

The remote control device may also receive, from the host computing device, a second video frame comprising second video data captured by the target device. A second time, which is chronologically later than the first time, may also be noted. The second time may correspond to when the second video frame is received by the remote control device. In some embodiments, the remote control device may start a timer after receiving the first video frame. In such embodiments, the second time may correspond to when the timer reaches a predetermined threshold that is indicative of latency.

Thus, the remote control device may determine, based on the first time and the second time, a latency in communication between the remote control device and the target device. The remote control device may display an alert graphic element indicating the latency in communication between the remote control device and the target device.

In some embodiments, the remote control device may extract, from the first video frame and the second video frame, metadata to evaluate communication between the host computing device and the target device. The metadata may indicate when the first video frame and the second video frame were respectively received by the host computing device from the one or more target systems. The metadata may be used to assess whether there was latency in communication between the target system and the host computing device.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1A:
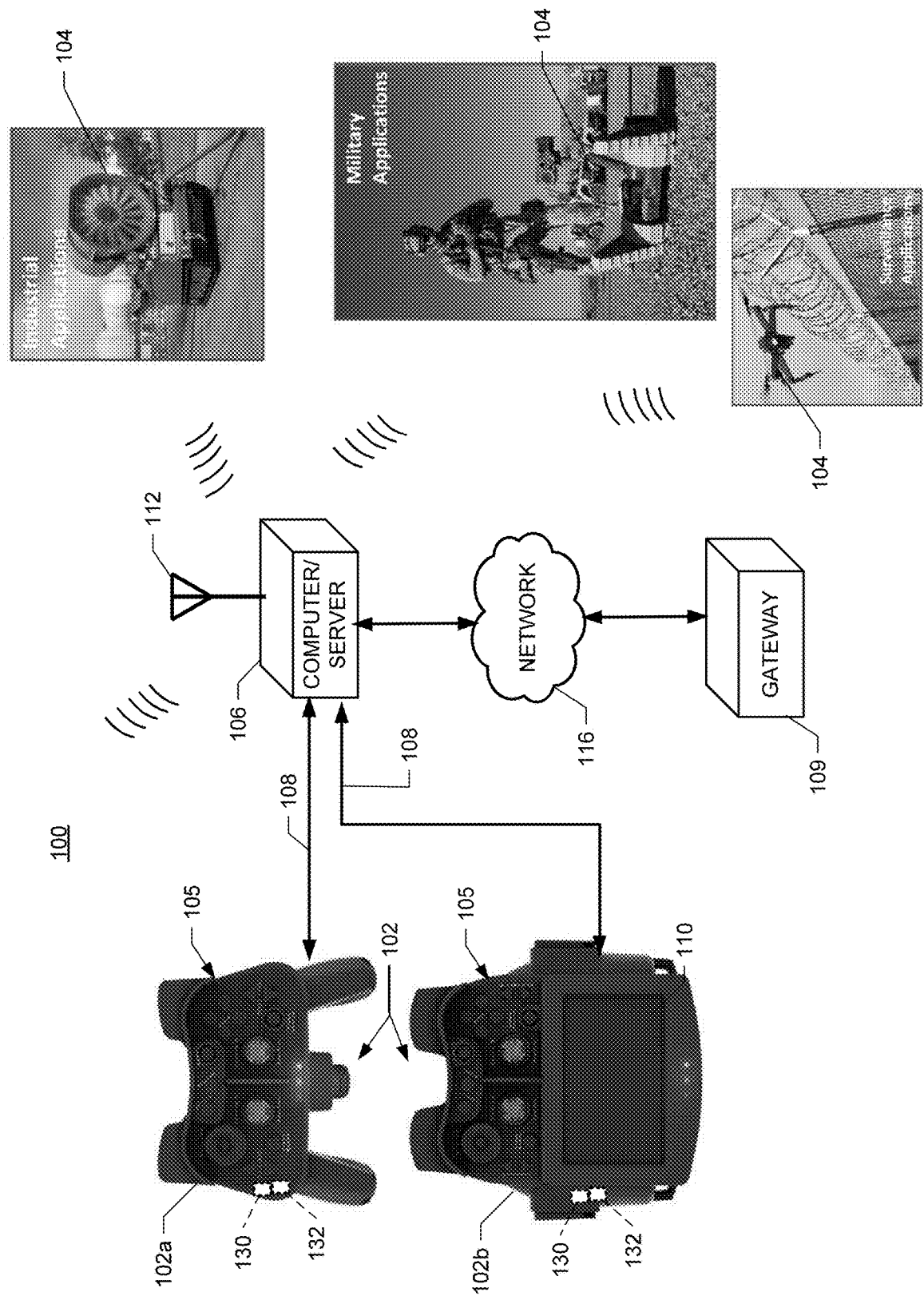
FIGS. 1A and 1B show examples of a target control system including an unmanned vehicle and a remote control, according to an example embodiment of the present disclosure.

The present disclosure relates in general to a method, system, and apparatus configured to provide video latency detection and/or loss of video signal detection in a controller for a remotely located system or a target system, such as an unmanned vehicle. The method, system, and apparatus are related to remote control units ("RCU") with an architecture that resolves the above-described issues of various RCUs by including an application program interface ("API") that can produce sophisticated display screens with overlaid graphics and text while involving small amounts of information from a host computer. The RCUs may be configured to detect video latency based on frame rate or reception time. For example, if a frame rate or reception time exceeds a threshold, an RCU may be configured to transmit an alert to a host computer from which video data may be received. Additionally or alternatively, an RCU may be configured to display an alert on a display screen that is indicative of the video latency. The alert may, for example, prevent an operator from taking an action knowing that the current video is not timely.

Reference is made herein to video data. As disclosed herein, video data may include a stream of video images or files. The video data may be received in the disclosed RCU in one or more messages. Each message may include one or more video files for one or more video images/frames. For example, each message may contain a video image/frame. Alternatively, a message may comprise two or more video images/frames. The video file may include an .avi file, .mp4 file, etc.

The messages or video images/frames may be received at a rate of 5 frames per second ("fps"), 10, 24, 30 fps, 60 fps, 120 fps, etc. The video data may include video recorded from a camera (e.g., a standard definition camera, a high-definition camera, a stereoscopic camera system, an infrared camera system etc.) of a target system. The video data may be used for navigation/control of the target system. In some embodiments, the video data may include at least a portion of the target system for control.

While the disclosure relates to video data, it should be appreciated that the disclosure may be applied to other sensed data as well. For example, the RCU may provide for data latency detection regarding sensor measurements or control surface attitude positioning/feedback.

Reference is also made herein to graphic elements. As disclosed herein, a graphic element may comprise a visual object that is displayed on a video display of a RCE. The graphic element may include video data as streamed from a target system, such as video data generated from a camera of an unmanned vehicle. The graphic element may additionally include text and/or numerical values. The graphic element may further include icons, an attitude indicator, a reticle, a wireframe, etc. It should be appreciated that a graphic element may include any visual object that provides information that is indicative of a status/location/position of a target system, a current position of each joint of a 6-degree of freedom of a robot arm, a mission being performed by a target system, or any other information related to a target system.

The following sections describe embodiments pertaining to unmanned vehicles. It should be appreciated that this is but one of many possible uses for the disclosed RCU. The RCUs may additionally be used for non-vehicular target systems, such as crane operation systems, remote camera surveillance systems (e.g., tripod, drone or vehicle based), and industrial equipment control systems, such as for mineral extraction. The RCUs disclosed herein may be provisioned for virtually any system that can be controlled remotely by an operator.

Reference is also made throughout to unmanned vehicles. As disclosed herein, an unmanned vehicle may include an unmanned aerial vehicle ("UAV") such as a drone, an unmanned underwater vehicle ("UUV"), an unmanned surface vehicle ("USV"), or an unmanned ground vehicle ("UGV"). The unmanned vehicles disclosed herein are not completely (or at all) autonomous. Instead, the unmanned vehicles disclosed herein may involve at least some control or instruction from one or more operators via one or more remote controls. The unmanned vehicles may be provisioned for surveillance/inspection/survey missions, rescue missions, firefighting missions, law enforcement missions, and/or military missions. For example, the unmanned vehicles disclosed herein may be used to provide inspections for the oil and gas industry, conduct environmental surveys, or scout dangerous situations.

Example System

Figure 1B:
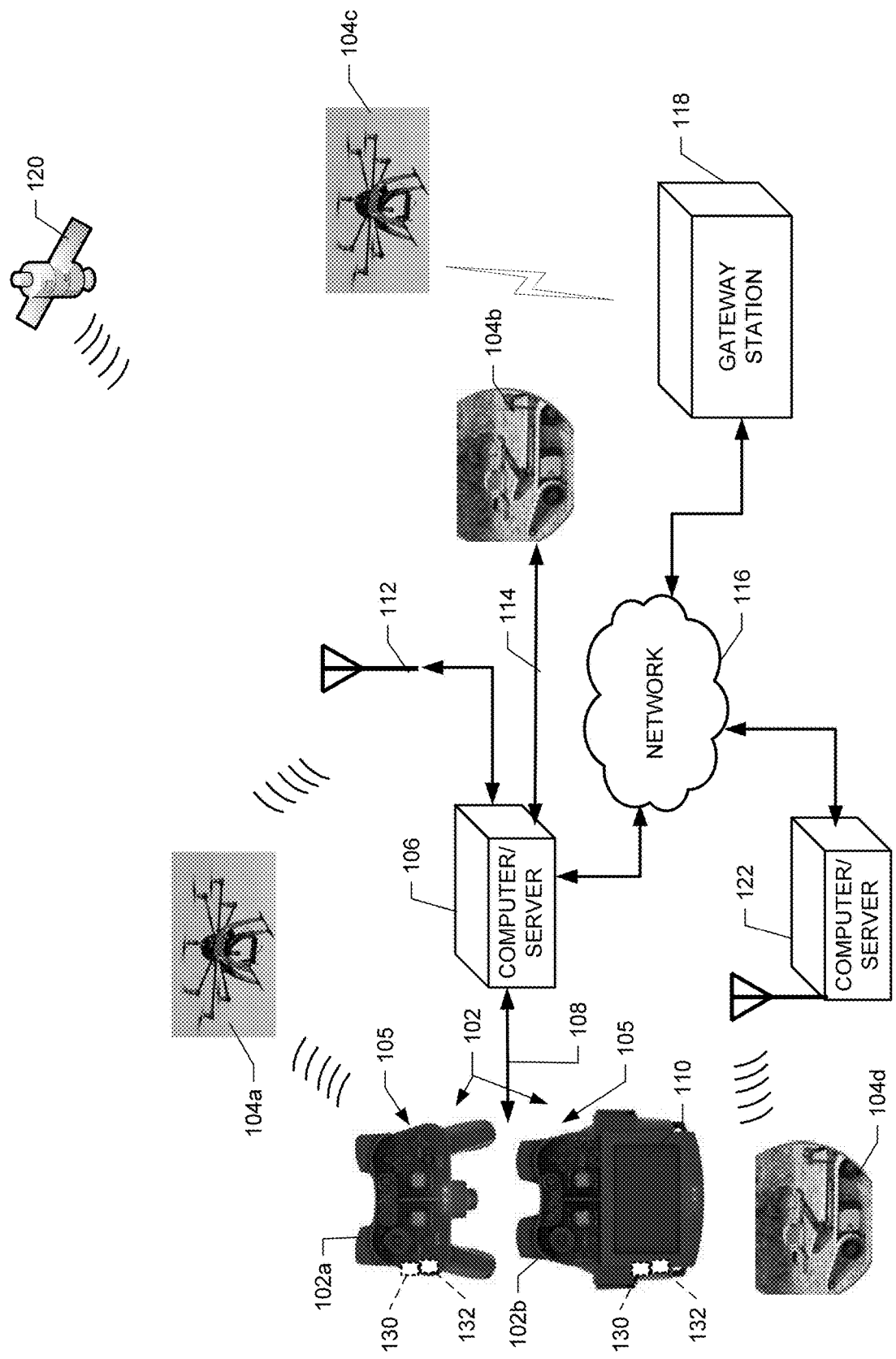

FIGS. 1A and 1B show diagrams of an example target control system 100, according to an example embodiment of the present disclosure. The example system 100 includes a remote control 102 (e.g., an RCU) for controlling one or more target systems, such as illustrated unmanned vehicles 104. The remote control 102 is communicatively coupled to a host computer/server 106 via a wired or wireless connection 108. The example connection 108 may include, for example, an RS-422/485 connection or other serial interface, a human interface device ("HID") interface, an Ethernet interface, a local area network ("LAN") interface, a USB interface, an HDMI interface, a Bluetooth® interface, a Zigbee® interface, etc.

FIG. 1A shows that that a remote control 102 may be interchangeably connected to the host computer 106. For example, the remote control 102a may be first connected to the host computer 106 for control of a target system 104 via line of sight. At a later time, a target system may have to move out of visual sight of an operator. At this time, the operator may remove the remote control 102a and attach the remote control 102b to the host computer 106. In some embodiments, the remote control 102b transmits a handshake message or connection message that indicates the remote control 102b includes a display screen 110. In response, the host computer 106 is configured to transmit command messages for displaying graphic elements and/or video on the display screen, as described in more detail below.

In the illustrated example, the host computer 106 is configured to be in communication with the one or more unmanned vehicles 104 via a vehicle control interface. In an example, the remote control 102 receives commends from a user via one or more button or switch 105 presses. The remote control 102 transmits signals or messages that are indicative of the commands to the host computer 106 via the connection 108. The host computer 106 converts the commands into one or more instruction messages that are formatted in a language/protocol of the unmanned vehicle 104. The host computer 106, using a specified communication link, transmits the instruction messages to the connected unmanned vehicle 104.

In addition to transmitting instructions, the host computer 106 is configured to receive feedback data from the unmanned vehicle 104. The data may include camera images, video images, audio, sensor data, diagnostic information (battery life, triggered fault codes, etc.), and aspect information (vehicle speed, heading, GPS coordinates, altitude, attitude, etc.). The host computer 106 is configured to process the feedback data for visual conveyance to an operator. For example, the host computer 106 may use GPS data for determining and showing a location of the unmanned vehicle on a map. In another example, the host computer 106 may use aspect information for updating a virtual instrument panel or reticle with data values received from the unmanned vehicle 104. In yet another example, the host computer 106 may display a model or graphical representation of a current position/arrangement of a target system, such as a position of a crane boom, jib, and/or hook. The host computer 106 also processes video images or streams for rendering. In some examples, the host computer 106 includes a display interface for displaying at least some of the command instructions and processed feedback data. Such information may be useful to mission operators or monitors. As mentioned above, the host computer 106 is configured to transmit at least some of the information to the remote control 102 for display on a local display screen 110.

As shown in the illustrated example, there are a number of ways the host computer 106 may be in communication with the unmanned vehicle 104. In some examples, the host computer 106 may be directly communicatively coupled to an antenna 112. In these examples, the host computer 106 includes a transceiver for wireless communication with the unmanned vehicle 104a. Alternatively, the host computer 106 is connected via a wiring harness or single wire 114 to an unmanned vehicle 104b, as shown in FIG. 1B. A hard wire 114 may be used in instances where the unmanned vehicle 104b is traveling through a location where wireless signals cannot propagate well, such as an indoor location or a submersible vehicle.

As shown in FIG. 1A, the host computer 106 is communicatively coupled to a gateway 109 via a network 116 (e.g., the Internet). The gateway 109 may include a command and control system from which at least some instructions for target systems 104 are provided. The command and control system enables remote operators to control a target system via a network connection to the host computer 106.

In yet another example, as shown in FIG. 1B, the host computer 106 is communicatively coupled to a gateway station 118 via the network 116. The gateway station 118 includes a satellite transceiver for communication with a satellite system 120. The satellite system 120 relays communications from the gateway station 118 to an unmanned vehicle 104c. Feedback data is transmitted from the unmanned vehicle 104c to the satellite system 120, and down to the gateway station 118, which formats the communications as Internet packets for transmission to the host computer 106. In this example, the gateway station 118 and satellite system 120 may be replaced with a cellular tower for cellular communications with an unmanned vehicle.

In yet other embodiments, the host computer 106 is communicatively coupled to another host computer 122, which includes a transceiver and antenna for wireless communication with an unmanned vehicle 104d. The host computer 106 may be connected to the host computer 122 via the network 116, which may include any cellular and/or wide area network. Further, in some instances, the remote control 102 includes a transceiver for direct wireless communication with an unmanned vehicle 104a, thereby bypassing and use of the host computer 106.

Generally, host computers 106 are configured and operated by third-parties. The computers 106 include software for establishing and maintaining a communication link with an unmanned vehicle. The software is also configured to process feedback data from the unmanned vehicle. Oftentimes, the manufacturer of the remote control 102 is different from the manufacture of the unmanned vehicle and/or operator of the computer 106. As such, the software on the host computer 106 includes a translator that converts commands from the remote control into instructions for the unmanned vehicle. This configurability enables any type of remote control to be used for virtually any type of unmanned vehicle.

The example remote control 102 of FIGS. 1A and 1B includes a display management system 130 and local memory 132. As disclosed herein, the display management system 130 provides for the display of video data and provides for latency detection/alerting. The management system 130 may also include APIs that may enable developers to create their own graphic elements, which are then stored to the local memory 132. During use, the host computer 106 is configured to transmit API calls that identify the graphic element and its location for display on the display screen 110 instead of transmitting complete visual files. The API calls may also include the data for population into a graphic element that is overlaid on video data, such as a warning notification. Such a configuration enables a third-party to customize the display screen 110 of the remote control 102 while reducing needed bandwidth with the host computer 106 during usage. This enables lower data connection types to be used between the remote control 102 and the host computer 106.

Remote Control Embodiment

Figure 2:
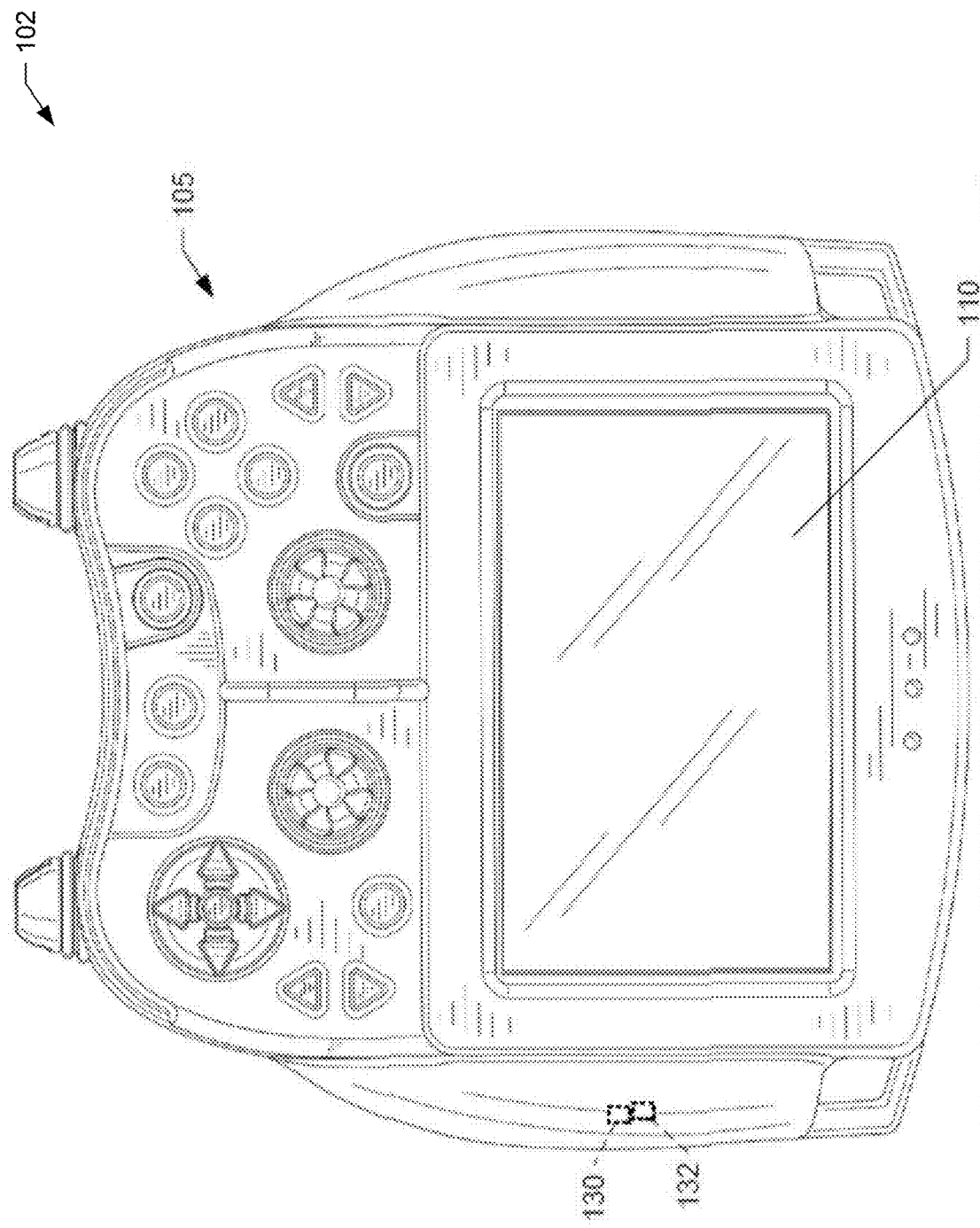
FIG. 2 shows a diagram of the remote control of FIGS. 1A and 1B, according to an example embodiment of the present disclosure.

FIG. 2 shows a diagram of the remote control 102 of FIGS. 1A and 1B, according to an example embodiment of the present disclosure. A top half of the remote control includes buttons and switches 105. These include toggle controls, multi-axis hall-effect joystick controls, push buttons, and up/down push buttons. It should be appreciated that the remote control 102 may include additional or fewer buttons. For example, the remote control 102 may include triggers and palm switches. The remote control 102 also includes a display screen 110, which may include a touch screen and/or a multi-function display ("MFD").

Figure 3:
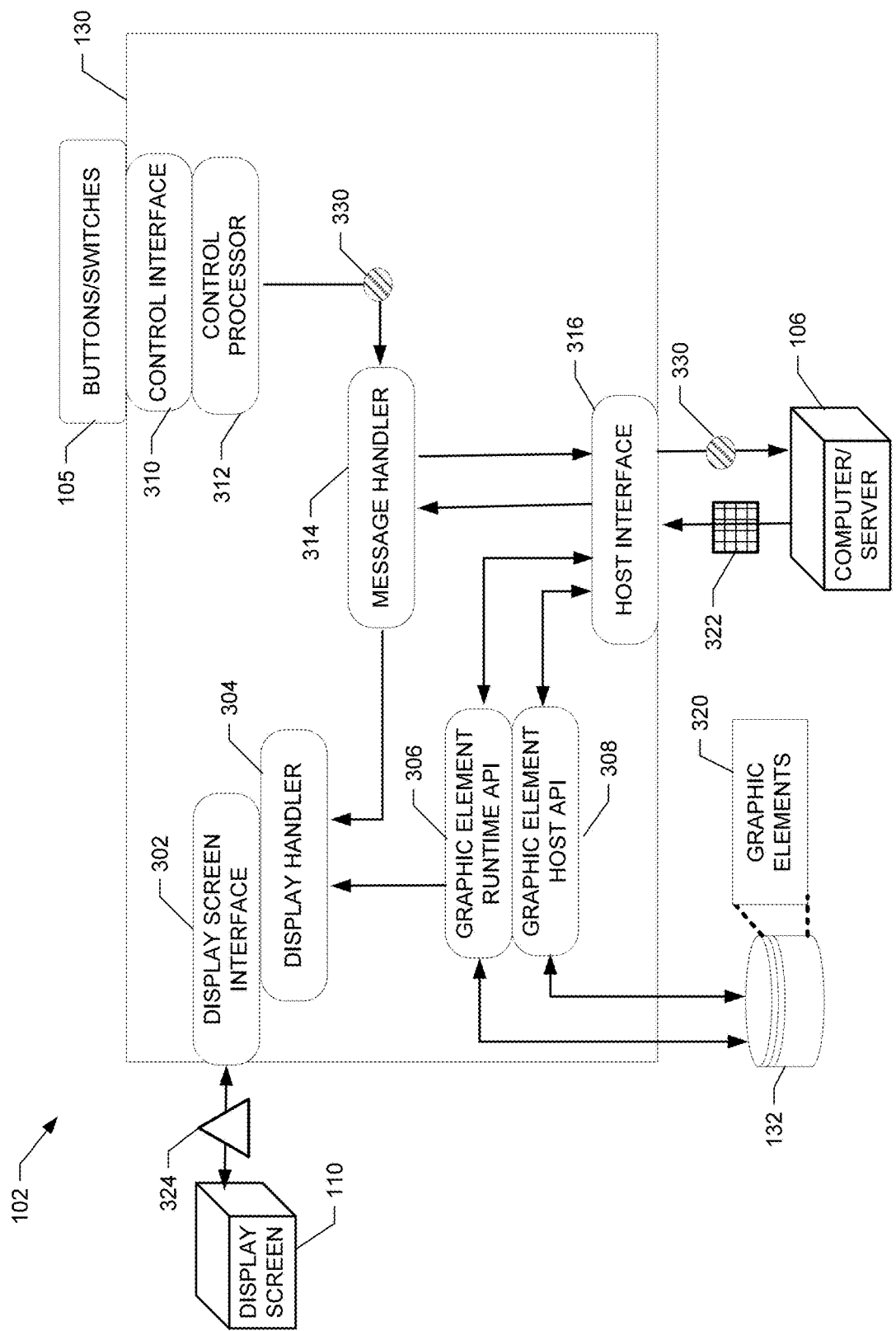
FIG. 3 shows a diagram that is illustrative of operations performed by the remote control of FIGS. 1 and 2, according to an example embodiment of the present disclosure.

The remote control 102 also includes a display management system 130, described in more detail in conjunction with FIG. 3. The display management system 130 includes one or more processors, microcontrollers, controllers, logic implementers, Application Specific Integrated Circuits ("ASICs") etc. that execute instructions (e.g., software) for transmitting commands from the switches 105 to the host computer 106 and processing data and messages from the host computer 106 for display on the display screen 110. As described herein, at least some graphic elements are stored to a memory device 132 of the remote control 102 to reduce the amount of data transmitted during control of an unmanned vehicle. The memory device 132 may include any volatile or non-volatile memory such as a flash memory, random-access memory ("RAM"), read-only memory ("ROM"), Electrically Erasable Programmable Read-Only Memory ("EEPROM"), etc.

FIG. 3 shows a diagram of the display management system 130 of the remote control 102 of FIGS. 1 and 2, according to an example embodiment of the present disclosure. The display management system 130 includes a display screen interface 302, a display handler 304, a graphic element runtime API 306, and a graphic element host API 308. FIG. 3 also shows that the display management system 130 includes a control interface 310, a control processor 312, a message handler 314, and a host interface 316. It should be appreciated that in other embodiments, the control interface 310, the control processor 312, the message handler 314, and the host interface 316 may be part of a control management system.

The components 302 to 316 of the remote control 102 are representative of hardware and/or software. For instance, one or more instructions may be stored to the memory device 132 that define operation of the components 302 to 316. Execution of the instructions by a processor of the remote control 102 causes the processor to perform the operations described herein. In some embodiments, the remote control 102 may also include a wireless transceiver for direct wireless communication with a target system.

The example host interface 316 is configured to communicate with the host computer 106 of FIGS. 1A and 1B. The host interface 316 may include one or more ports and be configured for corresponding communication protocol(s) to provide for communication via, for example, Ethernet, a LAN, a serial connection, a USB connection, a Bluetooth® connection, a Zigbee® connection, etc. In some embodiments, the host interface 316 is assigned an address, such as a MAC address, an IP address, a controller address, etc.

The example host interface 316 is in communication with the display handler 304 via the message handler 314. Video data 322 received in the host interface 316 from the host computer 106 is transmitted to the graphic element runtime API 306. The example API 306 determines parameters for displaying the video data 322, including a location for displaying the video data 322, a video menu, and/or other graphic elements that are to be displayed in conjunction with the video data, which may be specified by one or more identifiers in separate messages/files and/or specified with the video data. In some instances, the parameters and/or graphic element identifiers may be included with metadata of the video file.

The graphic element runtime API 306 uses the related parameters to determine that the video is for display and transmits the video data to the display handler 304. The graphic element runtime API 306 may also specify display screen locations and/or size for displaying the video data 322 on the display screen 110. The graphic element runtime API 306 may further specify graphic elements for display overlaid on or provided in proximity to the video data 322. The example display handler 304 renders the video data 322 (to create rendered video images 324) for display on the display screen 110. The rendered video 324 is transmitted to the display screen interface 302 where it is displayed on the display screen 110. In some alternative embodiments, the video data 322 that is received in the host interface 316 is transmitted instead to the message handler 314, which determines that the video is for display and transmits the video data to the display handler 304.

The example display handler 304 is configured to detect live or near real-time video latency. In some embodiments, the display handler 304 may include a callback function that alerts video processing operations each time that a new video frame is received and/or processed. The video processing operations of the display handler 304 determine a time difference between the current video frame relatively to the previous frame. The display handler 304 compares the computed difference value to one or more thresholds to determine if latency is occurring. In some embodiments, the threshold(s) is based on the frames per second of the received video. In other embodiments, the threshold(s) is a static number. The threshold in some instances may include a specified latency limit and/or video stream timeout value that is transmitted by the host system 106, which may be included with parameters specified with the video data 322 and/or stored in the memory device 132. If a threshold is exceeded, the example display handler 304 is configured to generate an alert message.

In some instances, the time difference threshold may be 50 ms, 100 ms, 500 ms, 750 ms, 1 second, 2, seconds, 5 seconds, 10 seconds, etc. In other instances, the time difference threshold may be 2 fps of the video data, 5 fps of the video data, 10 fps of the video data, 30 fps of the video data, 50 fps of the video data, etc. In the event that video frames are individually identified and/or coded, the example display handler 304 may compare values of the encoding and/or identification to ensure duplicate video frames are not being received. If a duplicate frame is received, the display handler 304 may disregard counting the duplicate video frame(s) as a subsequently received video frame.

In some embodiments, the display handler 304 may include a timer that is specified by a threshold. The display handler 304 resets the timer every time a new video frame is received and/or processed. If the timer reaches zero before a new video frame is received (if the timer counts down), an alert message is generated. In some instances, the display handler 304 may include a first timer for video latency and a second timer for loss of signal.

The example display handler 304 is configured to generate an alert message that indicates whether a video latency and/or video loss of signal threshold has been detected. The display handler 304 is configured to transmit the alert message to the host computer 106 via the message handler 314 and the host interface 316. The example host computer 106 determines how the alert is to be conveyed to the operator. In some instances, the host computer 106 transmits a message indicative that a graphic element related to video latency or loss of signal is to be displayed on the video screen. The graphic element may include text indicative that the current video image is not current and/or there is a loss of video signal. The graphic element may include animation to make itself more visible to the operator. In some instances, the message may indicate that the last displayed video image is to be removed from display of the display screen 110.

In some instances, the host computer 106 may cause a map or other graphical navigation aid to be displayed at the remote control 102 after receiving an alert that a video signal is not current. The navigational aid may compensate, at least temporarily, for the loss of a live video signal. Additionally or alternatively, the example host computer 106 may attempt to restart the video feed to the remote control 102 and/or reinitialize the video feed with the target system 104 after receiving an alert message.

If the display handler 304 detects that video frames resume to being received within the one or more specified thresholds, the display handler 304 may generate an alert-clear message. The message is transmitted to the host computer 106 via the message handler 314 and the host interface 316. After receiving the alert-clear message, the host computer 106 may transmit one or more messages to remove the alert graphic elements displayed on the display screen 110.

In some embodiments, the host computer 106 provides one or more messages to the display handler 304 via the host interface 316 to enable or disable latency detection and/or loss of signal detection. Reception of a disable message from the host computer 106 causes the display handler 304 to refrain from operating a timer or tracking frames for latency and/or loss of signal detection. As such, not only can the host computer 106 set video latency and/or loss of signal thresholds, the host computer 106 can command as to whether latency and/or loss of signal is detected at all.

Further, having the remote control 102 perform the latency and/or loss of signal detection may help offload the need for the host computer 106 from monitoring video latency and/or loss of signal. In an example, video may be transmitted to the remote control 102 from a camera at a target system 104. In this example, the host computer 106 may route the video data to the remote control 102 without having to process and/or analyze the video data content because, for example, the host computer 106 may not have a graphics processor. However, based on detection by the display handler 304, the host computer 106 can still be configured to determine if warnings and/or alerts are to be displayed at the remote control 102 to indicate that the video being viewed is suspect in some manner. This accordingly prevents an operator from trusting what they are seeing on the video screen 110 when making critical decisions.

As mentioned above, the example host interface 316 is also in communication with the graphic element runtime API 306 and the graphic element host API 308. The example edit API 308 is configured to enable the host computer 106 to provide instructions for creating, editing, managing, or otherwise manipulating graphic elements for graphic primitives, scalable symbology such as reticles and indicators, video streams, bitmap screen elements, and/or text generation.

Each graphic element includes one or more fields to define a visual appearance. Some fields may also enable a position of the graphic element to be specified. The host computer 106 accesses the host interface 106 and transmits a message or other command to access the graphic element host API 308. In some instances, selection of the API 308 causes the API to display a directory of graphic elements 320 that are already stored to the memory device 132. An operator may select one of these graphic elements, which causes the API to load the already specified field values into the property fields for the graphic element. An operator may then edit or otherwise modify the values in the fields.

After the graphic element has been specified by the host computer 106 (including alert messages related to video display), the operator passes or transmits the entered values to the edit API, which creates and/or stores the properties of the graphic element. In some embodiments, the host API 308 is configured to support Unicode Transformation Formation ("UTF-8") text for the development of multi-language menus and displays. At this point, the graphic element may be called or invoked through the graphic element runtime API 306 for display on the display screen 110.

To display a graphic element, the host computer 106 transmits a command message 322 to the host interface 316, which routes the command message 322 to the runtime API 306. The command message 322 includes an identification of the graphic element to display. The command may also include data values for display via the graphic elements, such as an altitude value. The command 322 may further include values to update one or more properties of the graphic element. This enables, for example, a graphic element's display location or appearance to be changed in real-time. After receiving the command the runtime API 306 is configured to search for, access, and retrieve the specified graphic element 320. The runtime API 306 may also populate one or more data fields with data and/or update display properties. The runtime API 306 then transmits the graphic element 320 to the display handler 304, which renders the graphic element. The display handler 304 may combine the graphic element with other graphic elements for display, such as video data, mission information, and/or other navigational aids in an overlay fashion. The interface 302 receives the rendered graphic element(s), converts them to video data, and causes them to be displayed on the display screen 110. The graphic element may be displayed until a command is received from the host computer 106 to remove its display, or upon selection of a different menu item or screen type by an operator.

In some instances, the runtime API 306 enables an operator to define and display graphics primitives and text in real-time. This may include designators, reticles and text windows. The runtime API 306 may be configured to enable a developer to define rectangles and circles (filled and wireframe) and lines, using a minimal amount of information. By providing an API command with attributes/properties to indicate a screen location for displaying these elements, only single commands are needed to update the attribute information to relocate, resize or recolor them. The APIs 306 and 308 may also provide for the storage and reference of font definition files for UTF-8 languages. A single command to the API 306 selects a font to use, where the API 306 interprets the UTF-8 codes to supply the specific text characters.

In addition to providing for the display of graphic elements stored in the memory device 132 and/or feedback data from the host computer 106, the example management system 130 of the remote control 102 is configured to receive inputs from an operator in the form of manual manipulations of its control switches and transducers (e.g., joysticks). The remote control 102 includes a plurality of buttons and switches 105 that are configured to receive an operator's input. The buttons and/or switches 105 operate with a control interface 310 that transduces movement of the buttons and/or switches 105 into an analog and/or digital signal that is indicative of and/or proportional to the button/switch movement.

A control processor 312 is configured to receive and convert the signals from the control interface 310 into one or more messages 330. The message may include a value indicative of the button movement. The message may also include an identifier of the button. The control processor 312 transmits the message(s) 330 to the message handler 314, which routes the message for transmission to the host computer 106 via the host interface 316. The message handler 314 may convert the message 330 into a format or protocol that is compatible with the communication link with the host computer 330. For example, the message handler 314 may convert the message to a first protocol for an RS-422 communication link, a second protocol for an Ethernet communication link, and a third protocol for a Bluetooth® or Zigbee® communication link. The example host computer 106 processes the message 330 for transmission to the unmanned vehicle 104, as shown in FIGS. 1A and 1B.

Figure 4:
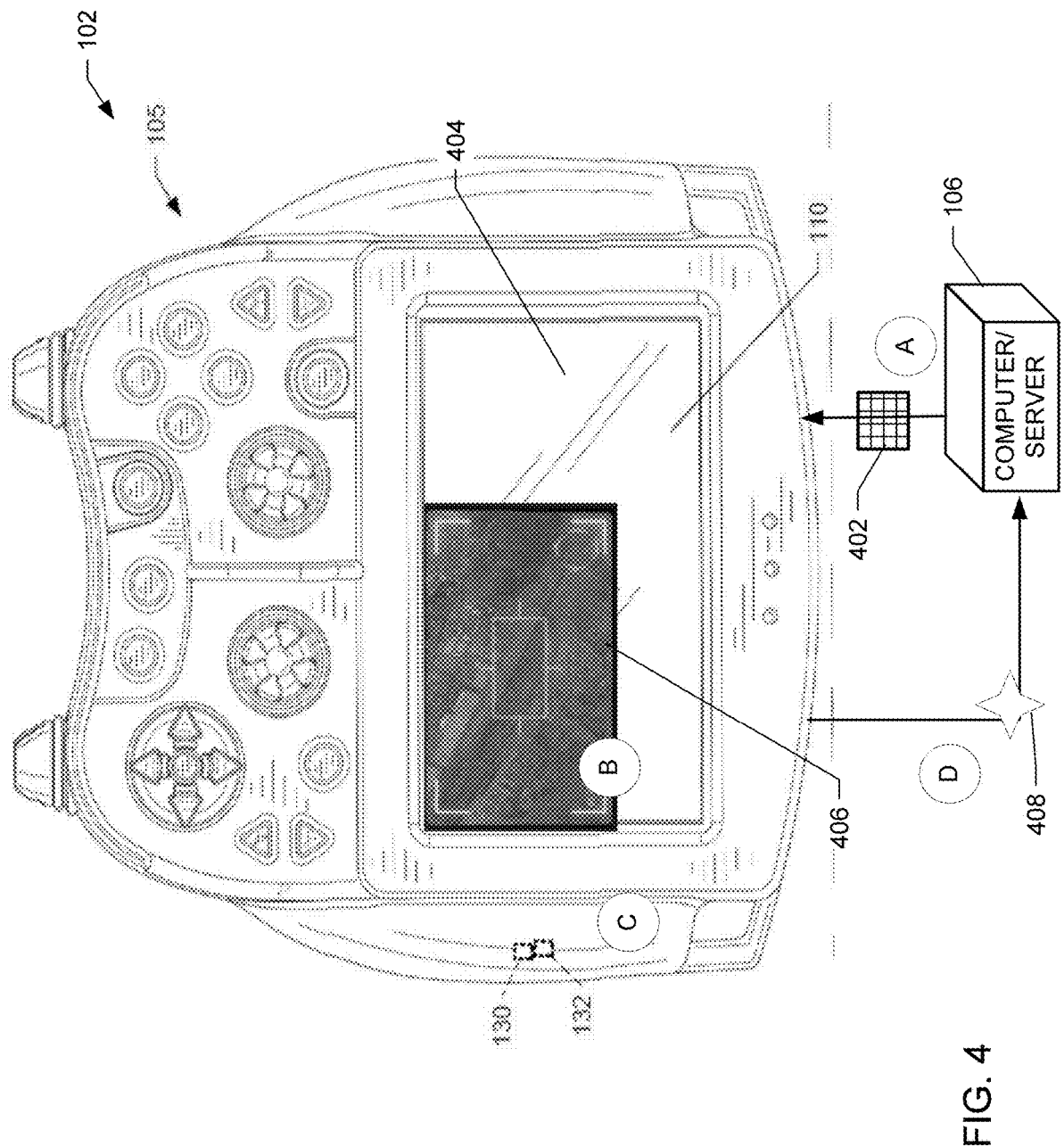
FIGS. 4 and 5 show an example process for detecting and making an operator aware of video latency and/or loss of a video signal on the remote control of FIGS. 1 to 3, according to an example embodiment of the present disclosure.

FIG. 4 shows an example process for detecting video latency and/or loss of video data on the remote control 102 of FIGS. 1 to 3, according to an example embodiment of the present disclosure. In the illustrated example, at Event A, the host computer 106 transmits video data 402 to the remote control 102. The video data 402 may be provided in a command message. At Event B, the video data is streamed to the remote control 102 for display on the display screen 110 as rendered video frame 404.

In some embodiments, the host computer 106 may also transmit a command message with the video data 402 or in a separate message. The message may also include an identifier for a wireframe file that shows a target area. A graphic element 406 specified by the wireframe file is shown. The command message may also specify a location where the graphic element 406 is to be displayed, and any display properties that are to be changed. The use of video data causes the graphic element 404 to be overlaid on top of the video. The wireframe file may include a property, that when set, causes the graphic element 404 to be displayed over a video image or video data.

After receiving the video data 402, at Event C, the management system 130 determines if the current video frame was received within one or more thresholds from a previous video frame. In other embodiments, the management system 130 determines if the video data 402 was received before one or more thresholds were reached. If the time difference thresholds (specified for the video data 402 by the host computer 106) are exceeded, at Event D, the management system 130 generates an alert message 408, which is transmitted to the host computer 106.

Figure 5:
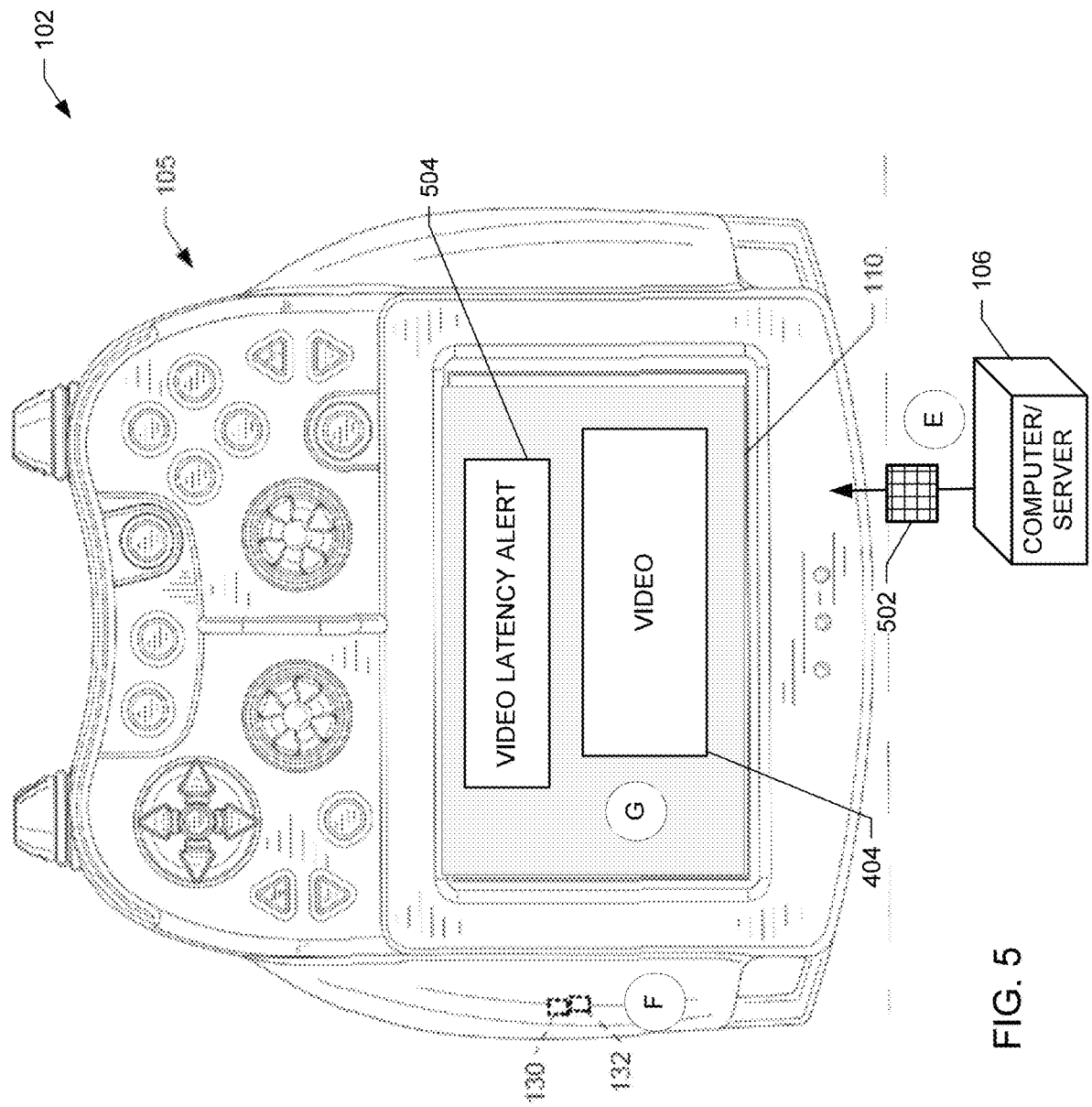

As shown in FIG. 5, at Event E, the host computer 106 uses the alert message to determine which graphic elements are to be displayed at the remote control 102. The host computer 106 generates an alert command message 502, which is transmitted to the management system 130. The command message 502 identifies an alert graphic element 504 and the video graphic element 404. In some embodiments, the host computer 106 may transmit separate command messages for the elements 504 and 404. The command message 502 may specify the file name of the alert graphic element 504, and include a location on the display screen 110. The command message 502 also specifies a new position and/or size for displaying the rendered video frame 404, which may include taking the last frame received and displaying it in the new location on the display screen 110.

At Event F, the management system 130 locates the files in the memory device 132. At Event G, the management system 130 causes the alert graphic element 504 and the rendered video frame 404 to be displayed. The alert graphic element 504 provides an indication that the video feed is experiencing latency that could affect navigational and/or other tactical decisions. For a loss of signal detection, the graphic element may specify that the video feed was lost. The host computer 106 may send subsequent command messages to update the display of the alert graphic element 504 based on whether video latency stops, or at least is below one or more specified thresholds, as reported by the management system 130.

Figure 6:
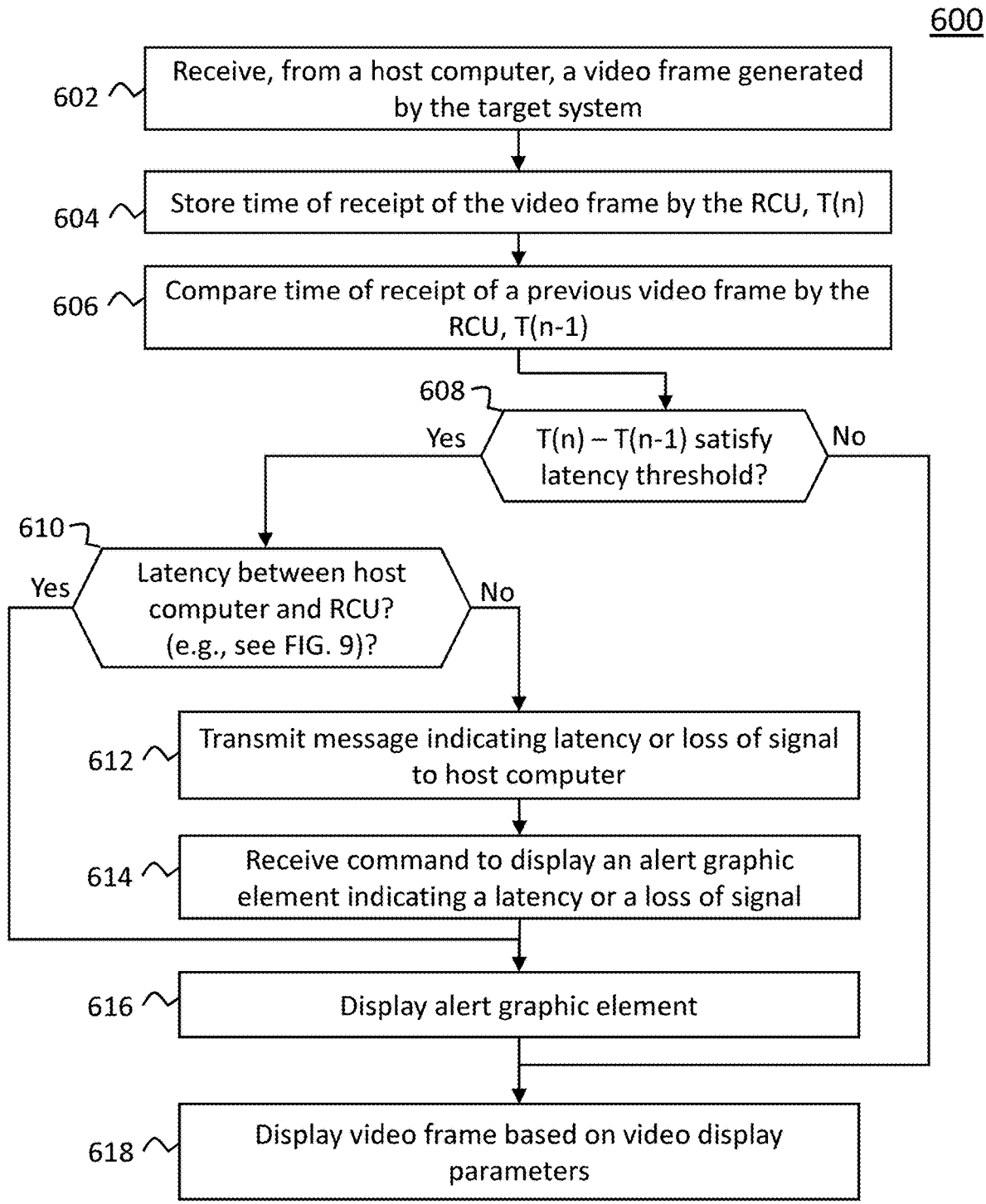
FIGS. 6 and 7 illustrate flowcharts of exemplary methods for latency detection performed by one or more processors of the remote control of FIGS. 1 to 3, according to example embodiments of the present disclosure.

FIG. 6 illustrates a flowchart of an exemplary method 600 for latency detection performed by one or more processors of the remote control 102 of FIGS. 1 to 3, according to an example embodiment of the present disclosure. For example one or more processors (e.g., control processor 312) of the remote control device 102 may execute one or more steps of the method 600 based on instructions stored in the memory device 130.

At step 602, the remote control device may receive, from a host computer, a video frame generated by a target system. The video frame may be a part of video data generated and/or captured by a camera of the target system (e.g., target system 104). The video data may be initially transmitted to the host computer, e.g., computer server 106. The host computer may further process the video data before the video data is sent to, and received by, the remote control device.

At step 604, the remote control device may store a time of receipt, T(n), of the video frame by the remote control device. The time that the remote control device receives the video frame from the host computing device, T(n), may be distinguishable from the time that the host computing device receives video data from the target system, as will be discussed further herein. The time of receipt, T(n), of the video frame by the remote control device may be stored, e.g., in memory 130 of remote control device 102.

At step 606, the remote control device may compare the aforementioned time of receipt, T(n), with a time of receipt of a previous video frame, T(n−1). As discussed previously, the host computing device relays video frames of video data captured by the target system. The video frames relayed to the remote control device may be sequential, and based on the sequence of video data generated based on events sensed by the camera of the target system. For clarity, consecutive video frames may be referred to as, for example, a first video frame and a second video frame, a video frame and a previous video frame, a video frame and a next video frame, etc. Thus, at step 606, the previous video frame may be the most recent video frame received by the remote control device from the host computing device. The time of receipt of the previous video frame by the remote control device and the time of receipt of the instant video frame may be compared to determine the duration of time between the receipt of each of the two video frames by the remote control device. That duration of time is computed using the difference in the times of receipt, T(n)-T(n−1).

At step 608, the remote control device may determine whether the difference, T(n)-T(n−1), satisfies a latency threshold. The latency threshold may be based on a predetermined range for a time interval between the receipt of consecutive video frames, where the predetermined range for the time interval is deemed as "normal" or otherwise lacking latency issues. For example, an operator of the remote control device viewing a video through video frames sent to the remote control device would not typically experience video "lagging" if the remote control device received video frames in time intervals that fell within the predetermined range. The latency threshold may thus be the outer limit of that predetermined range such that if video frames were to be received in time intervals beyond the outer limit, the operator would consider the output video as lagging or experiencing latency. Referring back to step 608, the remote control device may thus determine whether such latency exists if T(n)-T(n−1), the time interval between the instant video frame and a previously received video frame, satisfies (e.g., exceeds) the latency threshold (Step 608—Yes). If no latency exists between the target system and the remote control device, the remote control device may thus display the instant video frame based on video display parameters (e.g., as in step 618 described further below).

If T(n)-T(n−1) satisfies the latency threshold, there may be a latency in communication between the remote control device and the target system, as T(n)-T(n−1) represents the time interval for video frames received by the remote control device. However, as discussed previously, in order for the remote control device to receive video frames, the host computing device receives video frames from the target system, before video frames are relayed to the remote control device, Thus, determining a latency in communication between the target system and the remote control device may not reveal whether there is also a latency in communication between the host computer and the remote control device.

Figure 9:
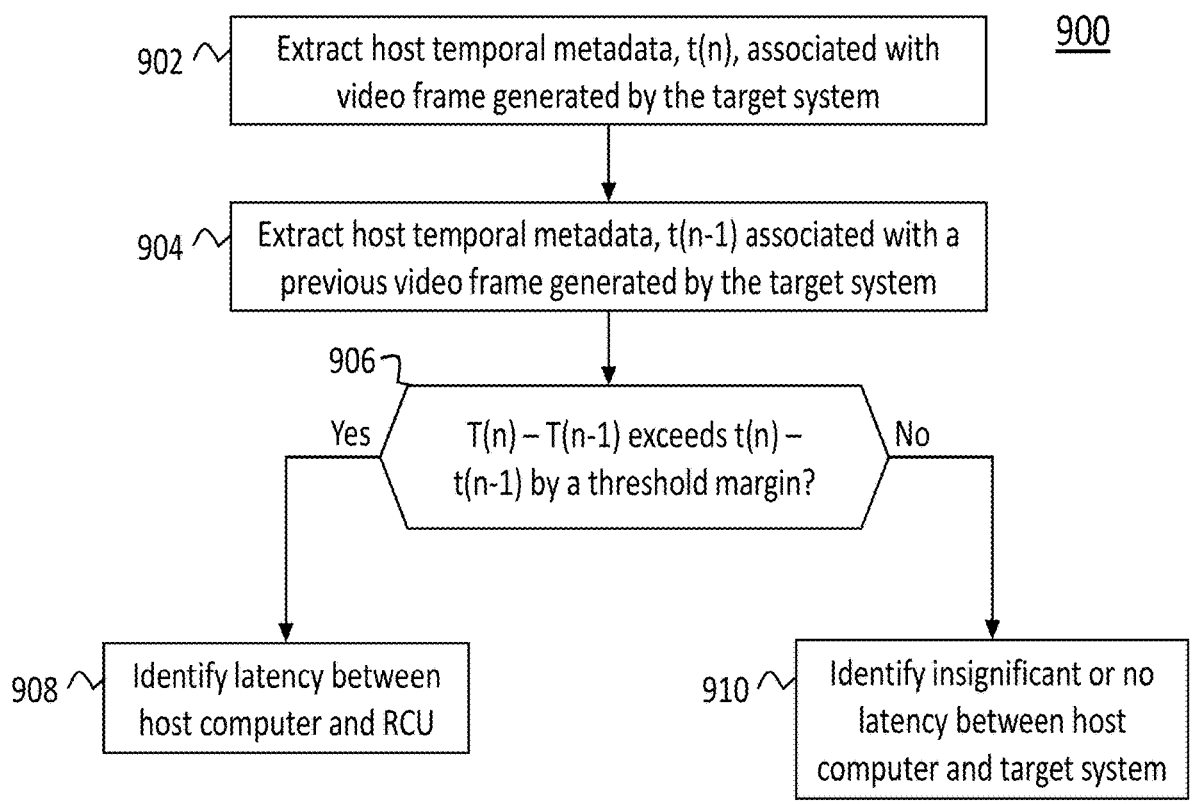
FIGS. 9 and 10 illustrate flowcharts of exemplary methods for detecting latency in communication between a host computer and a remote control, according to example embodiments of the present disclosure.

Thus, at step 610, the remote control device may determine whether there is latency between the host computer and the remote control device. As will be described further herein, FIG. 9 presents at least one method of determining whether there is latency between the host computer and the remote control device based on information received by the remote control device in the preceding steps of method 600.

At step 612, if there is no latency between the host computer and the remote control device, the remote control device may transmit the message indicating the latency between the target system and the remote control device to the host computer. As previously discussed, the latency between the target system and the remote control device was found by determining whether T(n)-T(n−) satisfies a latency threshold, and is distinguishable from the latency between the host computer and the remote control device. Upon receiving the messaging, the host computer may perform one or more steps as described in FIG. 8 to determine and transmit an identification of an alert graphic element, as will be discussed herein.

At step 614, the remote control device may receive a command to display the alert graphic element indicating the latency. After receiving the command, the remote control device may locate, using the identification, the alert graphic element stored in the memory device. The remote control device may thus retrieve the identified alert graphic element.

At step 616, the alert graphic element may be displayed. In some embodiments, the alert graphic element may be displayed simultaneously with a video frame. For example, the alert graphic element may be overlaid on the later video frame (e.g., the instant video frame), such as by presenting a sign over the later video reading: "Experiencing latency. This video may not be current."

At step 618, the remote control device may display the instant video frame based on video display parameters. Video display parameters may be preconfigured or adjusted by an operator of the remote control device or the host computer. The video display parameters may provide various display settings for viewing a video (e.g., brightness, contrast, tint, magnification, etc,), augment the display with various tools (e.g., scales, markings, labels, etc.), or otherwise customize the way video can be viewed in the remote control device.

It is to be understood that while one or more steps are described for detecting latency in communication (e.g., between the target system and the remote control device), the one or more steps may also be used or modified to detect a loss of signal. For example, the latency threshold at step 608 may be set at a higher level, such that a greater of interval of time between the receipt of the instant and previous video frame is needed for the remote control to identify a loss of signal. Additionally or alternatively, a loss of signal may be considered as a higher degree of latency.

Figure 7:
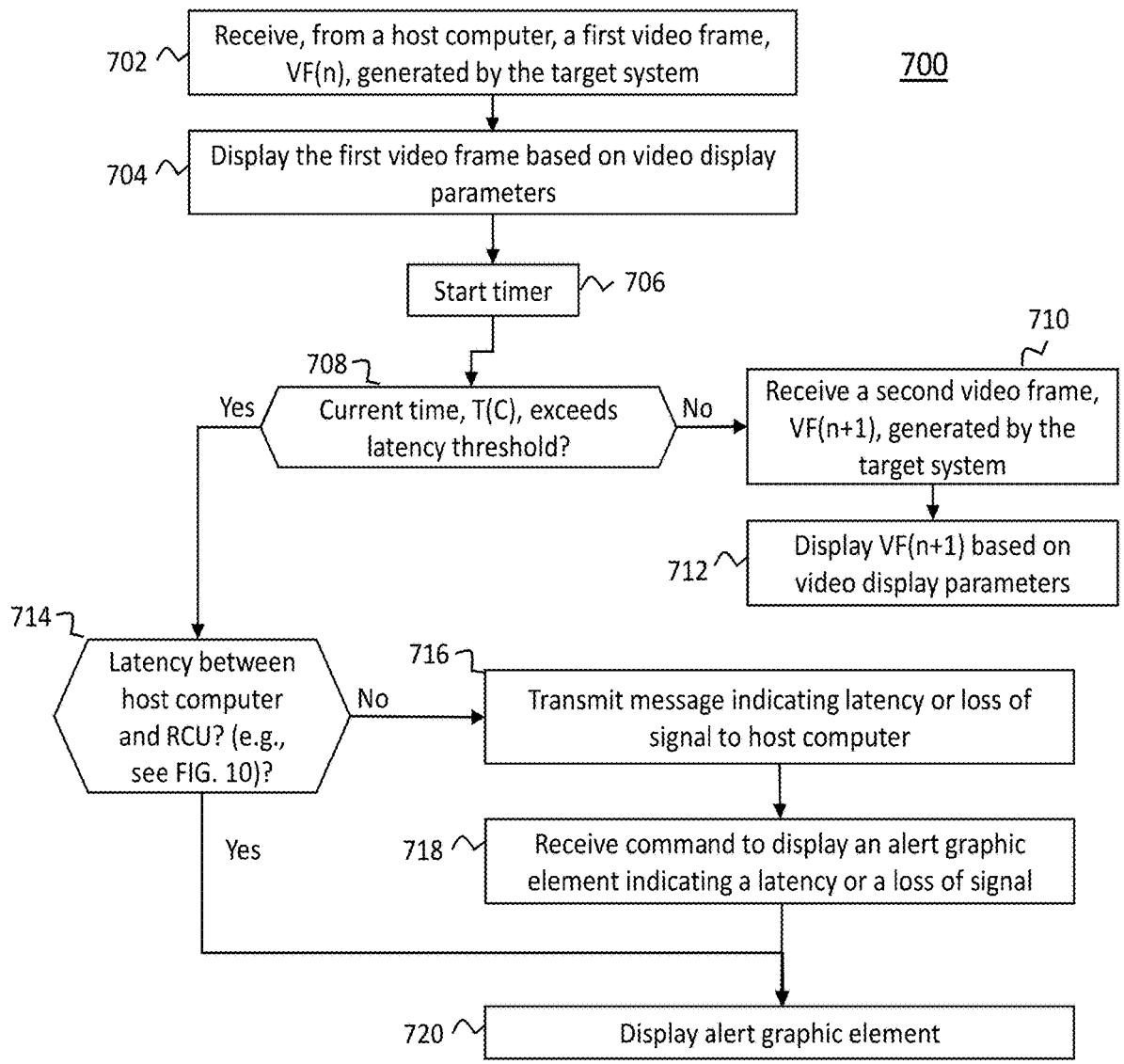

FIG. 7 illustrates a flowchart of another exemplary method 700 for latency detection performed by one or more processors of the remote control, according to an example embodiment of the present disclosure. For example, one or more processors (e.g., control processor 312) of the remote control device 102 may execute one or more steps of the method 700 based on instructions stored in the memory device 130.

At step 702, the remote control device may receive, from a host computer, a video frame (e.g., a first video frame). The first video frame, labeled as VF(n) for clarity, may be generated from video data captured by one or more cameras of the target system. The video data may be received by the host computer, processed, and then relayed to the remote control device.

At step 704, the remote control device may display the first video frame based on video display parameters. As discussed above, the video display parameters may be preconfigured or adjusted by an operator of the remote control device or the host computer.

However, at step 706, the remote control device may start a timer. The starting of the timer may be responsive to the receipt of the first video frame. Thus the start of the timer may represent the receipt of the first video frame by the remote control device. In some embodiments, the timer may comprise a digital counter, which stores the number of times computing processes has occurred, thereby functioning as a clock.

The remote control device may periodically monitor the current time of the timer, labelled as T(C) for clarity. For example, at step 708, the remote control device may determine whether the current time, T(C), exceeds a latency threshold. As discussed previously in regards to FIG. 6, the latency threshold may be based on a predetermined range for a time interval between the receipt of consecutive video frames, where the predetermined range for the time interval is deemed as "normal" or otherwise lacking latency issues. Thus, if the current time, T(C) exceeds the latency threshold, there may be a latency in communication between the remote control device and the target system.

Although the receiving of the first video frame, the displaying of the first video frame, and the starting of the timer are depicted in FIG. 7 as separate consecutive steps, it is assumed that in various embodiments, these steps may be performed almost contemporaneously so as to have the starting of the timer be representative of the receipt of the first video frame by the remote control device. In additional or alternative embodiments, step 708 may be periodically performed, e.g., at each step after the timer has been started. In another embodiment, the timer may be started before the first video frame is displayed.

If the remote control device determines that the current time, T(C), does not exceed the latency threshold, the remote control device may proceed with its routine operations of receiving and displaying video frames generated by the target system and relayed to the remote control device through the host computer.

For example, at step 710, the remote control device may receive a subsequent video frame ("second video frame"), labeled as VF(n+1).

At step 712, the remote control device may display VF(n+1) based on video display parameters discussed previously.

Although not shown in the figure, the spirit of method 700 is that after receiving each video frame from a host computer, the remote control device may start a timer to see whether the timer reaches a latency threshold before the receipt of the next video frame. Thus one or more steps, such as steps 702-708 may be repeated until a latency in communication between the remote control device and the target system has been detected (e.g., when T(C) exceeds the latency threshold).

As discussed previously, determining a latency in communication between the target system and the remote control device may not reveal whether there is also a latency in communication between the host computer and the remote control device.

Figure 10:
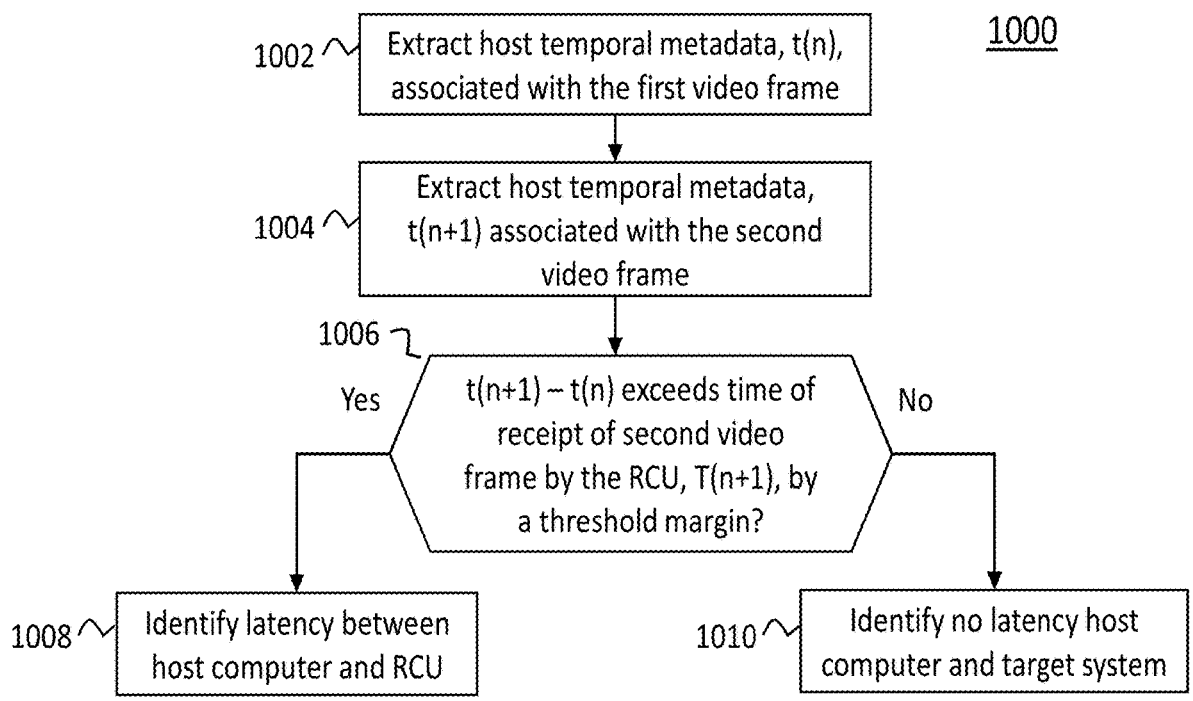

Thus, at step 714, the remote control device may determine whether there is latency between the host computer and the remote control device. As will be described further herein, FIG. 10 presents at least one method of determining whether there is latency between the host computer and the remote control device based on information received by the remote control device in the preceding steps of method 700.

At step 716, if there is no latency between the host computer and the remote control device, the remote control device may transmit the message indicating the latency between the target system and the remote control device to the host computer. Upon receiving the messaging, the host computer may perform one or more steps as described in FIG. 8 to determine and transmit an identification of an alert graphic element, as will be discussed herein.

At step 718, the remote control device may receive a command to display the alert graphic element indicating the latency. After receiving the command, the remote control device may locate, using the identification, the alert graphic element stored in the memory device. The remote control device may thus retrieve the identified alert graphic element.

At step 720, the remote control device may display alert graphic element. In some embodiments, if the remote control device has determined that there is latency communication between the host computer and the remote control device (e.g., step 714—Yes), the remote control device may proceed to display the alert graphic element. For example, the remote control device may display a notice for such circumstances on the display screen that reads: "System is experiencing latency issues. Please standby." Thus, the remote control device may circumvent the need to request permission and/or a command from the host computer to display an alert graphic element, if the remote control device has found that the communication between the host computer and the remote control device is experiencing latency issues.

Figure 8:
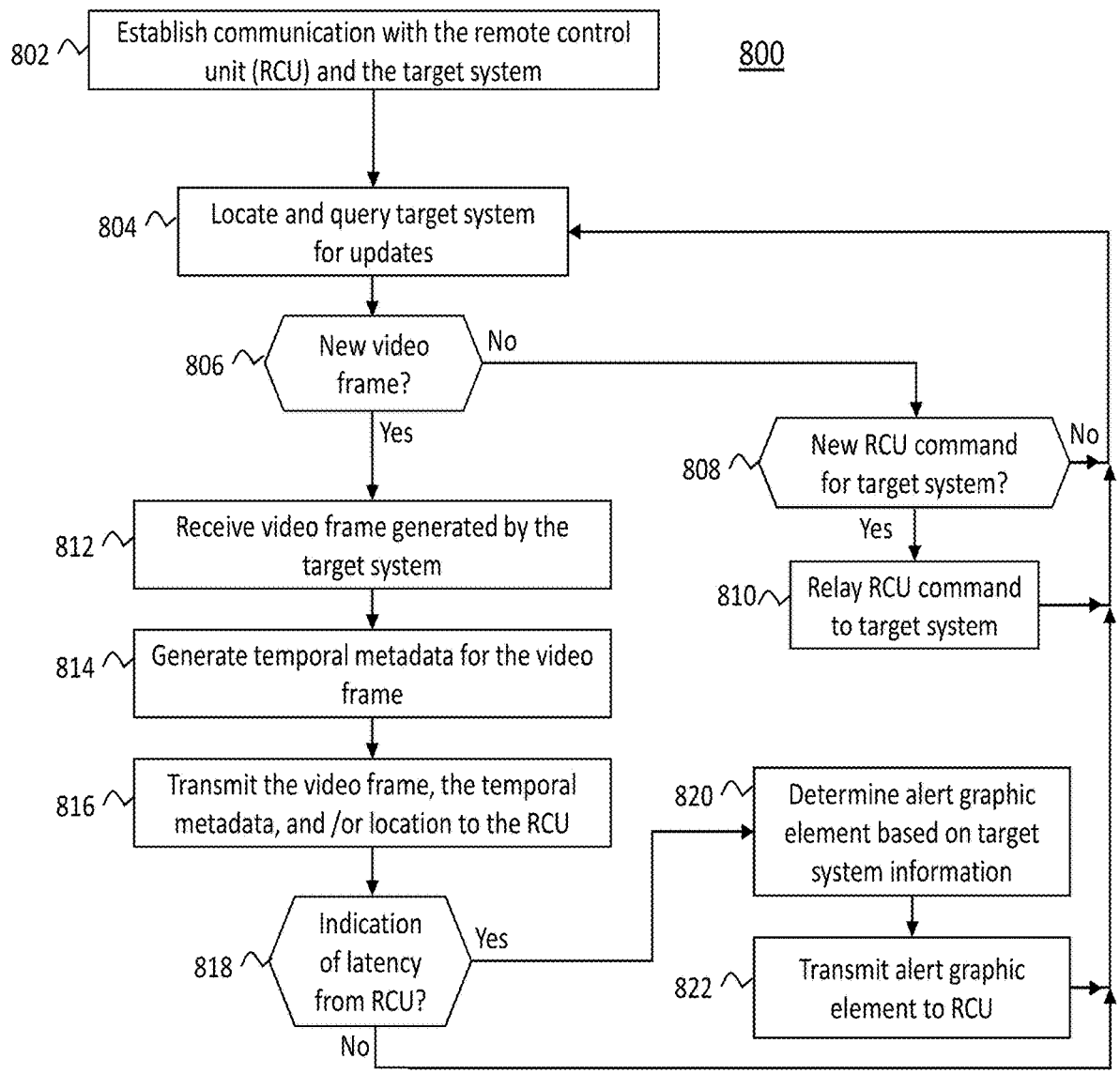
FIG. 8 illustrates a flowchart of an exemplary method performed by one or more processors of a host computing device, according to an example embodiment of the present disclosure.

FIG. 8 illustrates a flowchart of an exemplary method 800 performed by one or more processors of the host computing device, according to an example embodiment of the present disclosure. The host computing device may comprise, for example, the computer/server 106 as shown and described in connection with FIGS. 1 to 5. Furthermore, one or more steps of the method 800 may be performed by the host computer contemporaneously or in harmony with one or more steps of methods 600 or 700 performed by the remote control device.

At step 802, the host computer may establish communications with the remote control device and the target system. For example, upon initializing the system, the host computing device may roam its network to identify the presence of the remote control device and the target system via their respective MAC addresses.

At step 804, the host computer may locate and query the target system for updates. For example, the location of the target system may be tracked periodically via a global positioning system. The host computer may periodically ping the target system for any updates in any sensor data captured by any associated sensors. For example, the target system may be queried for updates to any video data captured by any associated camera.

Thus, at step 806, the host computer may determine whether there are any new video frames based on the captured video data. As discussed previously, video data may comprise a stream of video frames, with each frame having a chronological sequence. A new frame may be the latest, most recent frame in the sequence. If there are no new video frames, the host computer may perform other routine operations.

For example, at step 808, the host computer may determine whether it has received any commands from the remote control device ("RCU commands") for the target system. The commands may be based on user input via the control interface of the remote control device. Furthermore, each command may be related to, or correspond to, a requested movement of the target system.

At step 810, if there are RCU commands, the host computer may relay the RCU command to the target system for execution. In some aspects, the RCU commands may be converted to signals that are compatible with the target system.

At step 812, if there is a new video frame based on the video data being captured by the target system, the host computer may receive the video frame. For example, the video frame may be transmitted by the target system 102 to the computer/server 106 via the network 116. It is to be appreciated that consecutive video frames may be received by the host computer from the target system at different time intervals depending on the strength of communication between the host computer and the target system. The time intervals for the receipt of video frames by the host computer may not necessarily correspond to the time intervals for the receipt of video frames by the remote control device, as discussed previously.

At step 814, the host computer may generate temporal metadata for the received vide frame. For example, the host computer may determine and/or store the time at which a video frame was received. Also or alternatively, the host computer may measure and store the time interval at which the video frame was received (e.g., the duration of time since the previous video frame). The general temporal metadata may be associated with the received video frame. In some embodiments, the temporal metadata may be packaged with, embedded with, or otherwise relayed with the video frame so that a subsequent receiver of the video frame (e.g., the remote control device) may identify the time at which the video frame had been received by the host computer.

At step 816, the host computer may transmit the video frame, target system location and/or the temporal metadata associated with the video frame to the remote control device. The location.

At step 818, the host computer may determine whether the remote control device has indicated any latency with respect to communication between the remote control device and the target system via the host computer. For example, based on method 600, the remote control device may have transmitted a message to the host computer indicating latency at step 612 after determining that the difference in the time of receipt between two consecutive frames, $T(n)-T(n-1)$ satisfies a latency threshold. Also or alternatively, based on method 700, the remote control device may have transmitted a message to the host computer indicating latency at step 716 after determining that the current time, $T(C)$, of a timer exceeds the latency threshold.

At step 820, if the remote control device has indicated latency, the host computer may determine an alert graphic element based on target system information. For example, each target system may involve a unique remote control display configuration, which may involve a differently formatted alert graphic element. Furthermore, target systems may vary in the functions they perform (e.g., military, construction, mapping, package delivery). Thus, a different and/or customized alert messaging may be necessary based on the target system. If no latency has been indicated, the host computer may continue routine and/or iterative operations of locating and/or querying the target system for updates (e.g., as in step 804 onwards).

At step 822, the host computer may transmit the identifier of the alert graphic element to the remote control device. As discussed previously, the remote control device may thus receive the transmission as a command to display the alert graphic element, e.g., via the identifier. For example, the remote control device may use the identifier to locate and retrieve the alert graphic element for display. The alert graphic element may indicate that a latency in communication exists, or may indicate a severity of a latency (e.g., a loss of signal). In some embodiments, alert graphic elements may be transmitted from the host computer to the remote control device.

FIG. 9 illustrates a flowchart of an exemplary method 900 for detecting latency in communication between the host computer and the remote control device, according to an example embodiment of the present disclosure. Specifically, the method 900 is at least one exemplary method for performing step 610 of the method 600 shown in FIG. 6. The method 900 may be performed by one or more processors of the remote control device (e.g., remote control device 102). For example, after determining that there is a latency in communication between the remote control device and the target system via the host controller, the remote controller may need to know whether the latency is due to communication between the host computer and the target system or between the communication between the host computer and the remote control device. Such information about where the latency arises may be useful for prompting the operator to perform steps to rectify the latency. Such information may also be useful for the remote control device to bypass the need to notify and/or request input from the host computer to display the alert graphic element (e.g., when the latency has been found to be between the host computer and the remote control device).

At step 902, the remote control device may extract, from a received video frame, the temporal data concerning the receipt of the video frame by the host computer ("host temporal data"). The host temporal data, $t(n)$ may indicate the time associated with when the instant video frame had been received at the host computer from the target system.

At step 904, the remote control device may extract, from the previous video frame, the host temporal metadata, $t(n-1)$ associated with when the previous video frame has been received at the host computer from the target system. A difference in the host temporal data of the instant video frame and the previous video frame, $t(n)-t(n-1)$ may be the time interval between the receipt of the instant frame and the receipt of the previous video frame by the host computer.

At step 906, the remote control device may determine whether the time interval between the receipt of the consecutive video frames at the remote control device, $T(n)-T(n-1)$, exceeds, by a threshold margin, the time interval between the receipt of the consecutive video frames at the host computer, $t(n)-t(n-1)$.

If $T(n)-T(n-1)$ exceeds $t(n)-t(n-1)$ by the threshold margin, the remote control device may identify a latency in communication between the host computer and the remote control device at step 908.

However, if $T(n)-T(n-1)$ does not exceed $t(n)-t(n-1)$ by the threshold margin, the remote control device may identify there being insignificant or no latency in communication between the host computer and the target system.

FIG. 10 illustrates a flowchart of another exemplary method 1000 for detecting latency in communication between the host computer and the remote control device. Specifically, method 1000 is at least one exemplary method for performing step 714 of method 700 shown in FIG. 7. Method 1000 may be performed by one or more processors of the remote control device (e.g., remote control device 102). As discussed above, after determining that there is a latency in communication between the remote control device and the target system via the host controller, the remote controller may need to know whether the latency is due to communication between the host computer and the target system or due to communication between the host computer and the remote control device.

At step 1002, the remote control device may extract, from the first video frame (e.g., received by the remote control device in step 702), host temporal data associated with the first video frame. As discussed previously, the host temporal data, t(n) may indicate the time associated with when the first video frame had been received at the host computer from the target system.

At step 1004, the remote control device may extract, from the second video frame (e.g., received by the remote control device in step 710), the host temporal metadata, t(n+1) associated with when the second video frame had been received at the host computer from the target system. A difference in the host temporal data between the second video frame and the first video frame, t(n+1)-t(n), may be the time interval between the receipt of the second video frame and the receipt of the first video frame by the host computer.

At step 1006, the remote control device may determine whether the time of the timer when the second video frame had been received by the remote control device, T(n+1) exceeds the time interval between the receipt of the consecutive video frames at the host computer, t(n+1)-t(n) by a threshold margin.

If T(n+1) exceeds t(n+1)-t(n) by the threshold margin, the remote control device may identify a latency in communication between the host computer and the remote control device at step 1008.

However, if T(n+1) does not exceed t(n+1)-t(n) by the threshold margin, the remote control device may identify there being insignificant and/or no latency in communication between the host computer and the target system at step 1010.

CONCLUSION

It will be appreciated that each of the systems, structures, methods and procedures described herein may be implemented using one or more computer programs or components. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112 (f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof.

The invention is claimed as follows:

1. A remote control apparatus for one or more target systems comprising:
   a display screen for displaying video data and graphic elements;
   a memory device storing a file for:
      an alert graphic element and display parameters for displaying the alert graphic element, and
      a video data graphic element having video display parameters for displaying video data, the video display parameters including at least one of a latency threshold or a loss of signal threshold;
   a communication interface comprising an application programming interface ("API") communicatively coupled to the memory device, wherein the communication interface enables a host computer to specify the display parameters of the alert graphic element and the video display parameters of the video data graphic element, and cause the video data and the graphic elements to be displayed; and
   a processor configured to:
      receive a video frame from the host computer via the API, the video frame including first metadata indicating when the video frame was received by the host computer from a target system,
      determine a time difference between the video frame and a previous video frame, the previous video frame including second metadata indicating when the previous video frame was received by the host computer from the target system,
      compare the time difference to at least one of the latency threshold or the loss of signal threshold,
      transmit an alert message to the host computer indicative that the time difference exceeds the at least one of the latency threshold or the loss of signal threshold,
      receive a command message from the host computer via the API, the command message identifying the alert graphic element,
      determine that the command message is related to the alert graphic element stored in the memory device, and
      cause the alert graphic element to be displayed on the display screen.

2. The apparatus of claim 1, wherein the alert graphic element indicates a latency in communication between the host computer and the target system.

3. The apparatus of claim 2, wherein the remote control apparatus is configured to control the target system via the host computer.

4. The apparatus of claim 1, wherein the at least one of the latency threshold or the loss of signal threshold is between 50 milliseconds ("ms") and 10 seconds.

5. The apparatus of claim 1, wherein the processor is configured to:
   determine the video frame corresponds to the video data graphic element in the memory device; and
   cause the video frame to be displayed within the video data graphic element on the display screen based on the video display parameters.

6. The apparatus of claim 1, wherein the communication interface is communicatively coupled to the host computer via at least one of a serial connection, an Ethernet connection, a Bluetooth® connection, or a Zigbee® connection.

7. A remote control apparatus for one or more target systems comprising:
   a display screen for displaying video data and graphic elements;
   a memory device storing a file for an alert graphic element and display parameters for displaying the alert graphic element, the display parameters including at least one of a latency threshold or a loss of signal threshold for video data;

a communication interface comprising an application programming interface ("API") communicatively coupled to the memory device, wherein the communication interface enables a host computer to specify the display parameters of the alert graphic element; and a processor configured to:
  receive a video frame from the host computer via the API, the video frame including first metadata indicating when the video frame was received by the host computer from a target system,
  determine a time difference between the video frame and a previous video frame, the previous video frame including second metadata indicating when the previous video frame was received by the host computer from the target system,
  compare the time difference to at least one of the latency threshold or the loss of signal threshold,
  transmit an alert message to the host computer indicative that the time difference exceeds the at least one of the latency threshold or the loss of signal threshold,
  receive a command message from the host computer via the API, the command message identifying the alert graphic element,
  determine that the command message is related to the alert graphic element stored in the memory device, and
  cause the alert graphic element to be displayed on the display screen.

8. The apparatus of claim 7, wherein the alert graphic element indicates a latency in communication between the host computer and the target system.

9. The apparatus of claim 8, wherein the remote control apparatus is configured to control the target system via the host computer.

10. The apparatus of claim 7, wherein the at least one of the latency threshold or the loss of signal threshold is between 50 milliseconds ("ms") and 10 seconds.

11. The apparatus of claim 7, wherein the processor is configured to:
  determine the video frame corresponds to a video data graphic element in the memory device; and
  cause the video frame to be displayed within the video data graphic element on the display screen based on video display parameters.

12. The apparatus of claim 7, wherein the communication interface is communicatively coupled to the host computer via at least one of a serial connection, an Ethernet connection, a Bluetooth® connection, or a Zigbee® connection.

* * * * *